United States Patent
Chen et al.

(10) Patent No.: US 9,833,760 B2
(45) Date of Patent: Dec. 5, 2017

(54) METHOD AND DEVICE FOR PREPARING ACTIVE PARTICLE-CONTAINING STEAM

(71) Applicant: WUHAN KAIDI ENGINEERING TECHNOLOGY RESEARCH INSTITUTE CO., LTD., Wuhan (CN)

(72) Inventors: Yilong Chen, Wuhan (CN); Yanfeng Zhang, Wuhan (CN); Minxia Cao, Wuhan (CN); Hong Li, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 503 days.

(21) Appl. No.: 13/929,847

(22) Filed: Jun. 28, 2013

(65) Prior Publication Data

US 2013/0289143 A1    Oct. 31, 2013

Related U.S. Application Data

(63) Continuation-in-part of application No. PCT/CN2011/078242, filed on Aug. 11, 2011.

(30) Foreign Application Priority Data

Dec. 31, 2010  (CN) .......................... 2010 1 0617855

(51) Int. Cl.
    *B01J 12/00*  (2006.01)
    *C10J 3/00*   (2006.01)
    *B01J 19/08*  (2006.01)

(52) U.S. Cl.
    CPC .......... *B01J 12/002* (2013.01); *B01J 19/088* (2013.01); *C10J 3/00* (2013.01); *B01J 2219/0869* (2013.01); *B01J 2219/0883* (2013.01); *B01J 2219/0894* (2013.01); *C10J 2300/0916* (2013.01); *C10J 2300/0946* (2013.01); *C10J 2300/0976* (2013.01); *C10J 2300/1238* (2013.01)

(58) Field of Classification Search
    CPC  B01J 12/002; B01J 19/088; B01J 2219/0869;
         B01J 2219/0883; B01J 2219/0894; C10J
         3/00; C10J 2300/0916; C10J 2300/0946;
         C10J 2300/0976; C10J 2300/1238; H05H
         1/34; H05H 2001/3468; H05H
         2001/3484; H05H 1/30; Y10S 588/901
    See application file for complete search history.

(56) References Cited

U.S. PATENT DOCUMENTS

2010/0252537  A1*  10/2010  Li .......................... H05H 1/34
                                                      219/121.5

* cited by examiner

*Primary Examiner* — Xiuyu Tai
(74) *Attorney, Agent, or Firm* — Matthias Scholl P.C.; Matthias Scholl

(57) ABSTRACT

A method for preparing high-temperature, active particle-containing steam. The method includes: 1) preparing steam; selecting one or several non-oxidizing gases as a working gas; ionizing the working gas into a plasma working medium by using a plasma generator; and 2) injecting the plasma working medium into a high-temperature steam generator to form high-temperature ionized environment while introducing the steam into the high-temperature steam generator for allowing the steam to contact with the plasma working medium so that the steam is heated and activated to form active particle-containing steam. A device for preparing the high-temperature, active particle-containing steam is also provided.

20 Claims, 3 Drawing Sheets

METHOD AND DEVICE FOR PREPARING ACTIVE PARTICLE-CONTAINING STEAM

CROSS-REFERENCE TO RELATED APPLICATIONS

This application is a continuation-in-part of International Patent Application No. PCT/CN2011/078242 with an international filing date of Aug. 11, 2011, designating the United States, now pending, and further claims priority benefits to Chinese Patent Application No. 201010617855.0 filed Dec. 31, 2010. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

Field of the Invention

The invention relates to a method and a device for preparing high-temperature, active particle-containing steam by using plasma, and more particularly to a method for preparing high-temperature and high activity steam that is used for improving gasification intensity in the process of gasification and conversion of coal, biomass, and garbage.

Description of the Related Art

Steam thermal plasma, used for the gasification and conversion of coal, biomass, and garbage, can improve the gasification intensity and adjust the proportion of an effective gas of $H_2$ in a syngas, thereby enabling the syngas to meet different requirements in specific use. A conventional method of steam gasification employs steam as a working gas of the plasma. However, the steam has oxidizing ability, which accelerates the electrode consumption to a certain degree, and thus the service life of the electrodes is shortened.

SUMMARY OF THE INVENTION

In view of the above-described problems, it is one objective of the invention to provide a method and a device for preparing high-temperature, active particle-containing steam by using plasma. The method employs a non-oxidizing gas as working gas to produce high-temperature plasma which heats vapor steam to yield high-temperature, active particle-containing steam, thereby preventing the contact between the steam and the electrode and prolonging the service life of the electrode.

To achieve the above objective, in accordance with one embodiment of the invention, there is provided a method for preparing high-temperature, active particle-containing steam, the method comprising the following steps:

1) preparing steam; selecting one or several non-oxidizing gases as a working gas; ionizing the working gas into a plasma working medium by using a plasma generator; and
2) injecting the plasma working medium into a high-temperature steam generator comprising a rotary guide vane to form high-temperature ionized environment while introducing the steam through the rotary guide vane into the high-temperature steam generator for allowing the steam to contact with the plasma working medium so that the steam is heated and activated to form active particle-containing steam.

In a class of this embodiment, the working gas in step 1) is ionized into high-temperature plasma having a temperature of between 3,000 and 12,000 K by the plasma generator.

In a class of this embodiment, the working gas is nitrogen.

In a class of this embodiment, the plasma working medium in step 2) is injected into the high-temperature steam generator at a speed of between 30 and 100 m/s. The steam is injected into the high-temperature steam generator at a speed of between 5 and 30 m/s. A mass flow ratio of the plasma working medium to the steam in the high-temperature steam generator is adjusted for enabling the steam at an outlet of the high-temperature steam generator to have a temperature of between 1,000 and 4,000 K.

In a class of this embodiment, between 1 and 4 annular gaps are arranged at intervals on a housing of the high-temperature steam generator; part of the steam is guided through the annular gaps into the high-temperature steam generator by the force of a pressure conveyor and forms a water film on a wall of the high-temperature steam generator for protection.

In a class of this embodiment, the steam input into the high-temperature steam generator is saturated steam.

The invention further provides a device for preparing high-temperature, active particle-containing steam by using plasma, the device comprising: a plasma generator; and a high-temperature steam generator. A plasma inlet is arranged at a central part of one end of the high-temperature steam generator and communicates with an outlet of the plasma generator. The plasma generator is provided with a non-oxidizing gas inlet. An annular steam inlet is provided to surround the plasma inlet. A rotary guide vane is disposed inside the annular steam inlet.

In a class of this embodiment, the high-temperature steam generator comprises a housing in a gradually enlarged step structure. The housing comprises between 1 and 4 steps. An annular gap is arranged between every two adjacent steps of the housing for allowing the steam to enter the high-temperature steam generator. The annular gap is connected to a pressure conveyor.

In a class of this embodiment, each of the gradually enlarged steps of the housing has a length of between 300 and 800 mm.

In a class of this embodiment, the annular gap has a radial width of between 3 and 15 mm.

Advantages of the invention are summarized as follows:

The method employs a non-oxidizing gas as the working gas, which poses no corrosion on the plasma generator. Besides, the steam is introduced through an individual inlet, thus, the steam does not contact with the electrode, thereby prolonging the service life of the electrode.

The steam is introduced into the high-temperature ionized environment in the high-temperature steam generator through the rotary guide vane disposed inside the annular steam inlet at high speed, so that the steam is instantly mixed and contacts with the high-temperature plasma and is heated and activated to form the active particle-containing steam. The mass flow ratio of the plasma working medium to the steam in the high-temperature steam generator is adjusted for enabling the steam at the outlet of the high-temperature steam generator to have a temperature of between 1,000 and 4,000 K, thereby meeting the requirement for gasification. Part of the steam is guided through the annular gaps into the high-temperature steam generator and forms a low temperature water film on the wall of the high-temperature steam generator for protection.

DETAILED DESCRIPTION OF THE EMBODIMENTS

To further illustrate the invention, experiments detailing a method and a device for preparing high-temperature, active particle-containing steam by using plasma are described below. It should be noted that the following examples are intended to describe and not to limit the invention.

Figure 1:
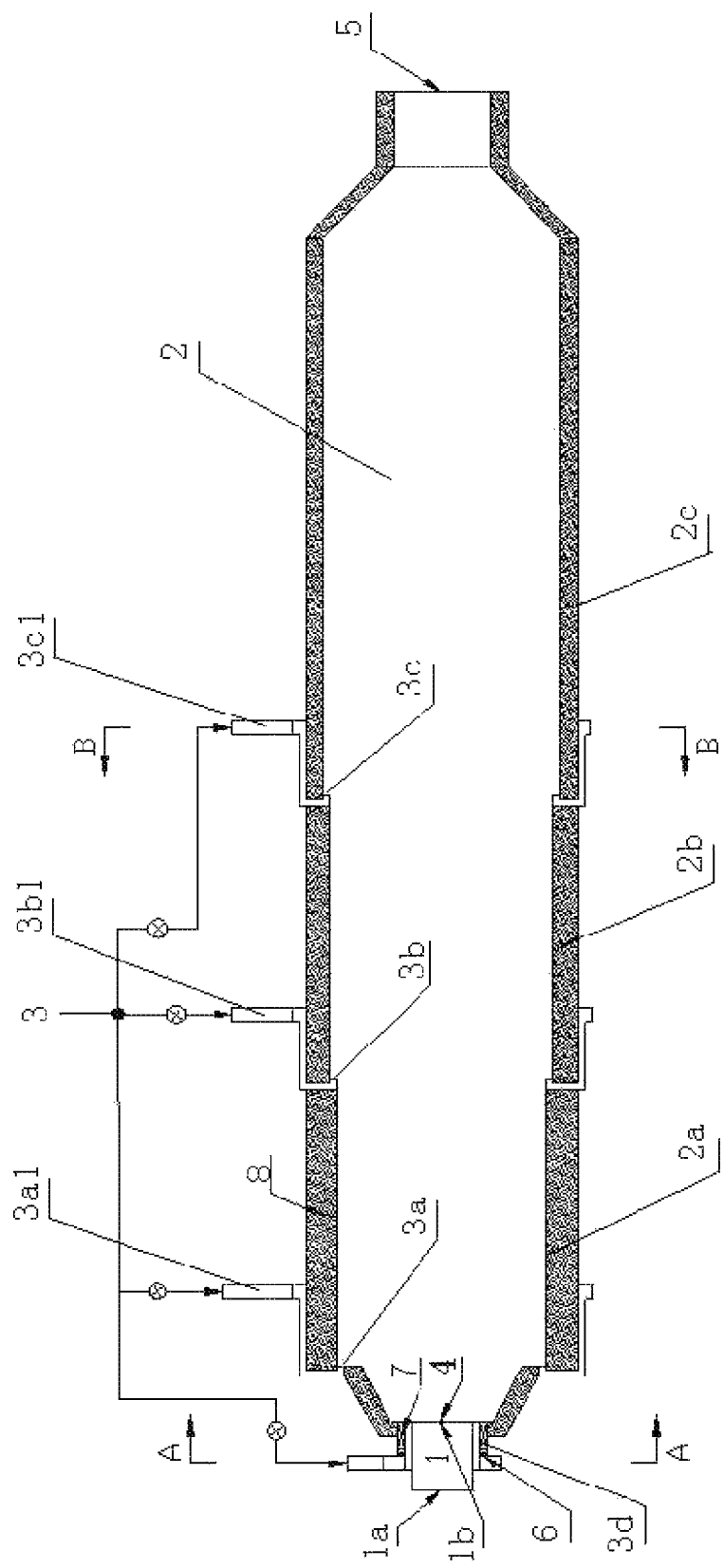
FIG. 1 is a structure diagram of a device for preparing high-temperature, active particle-containing steam by using plasma.
Figure 2:
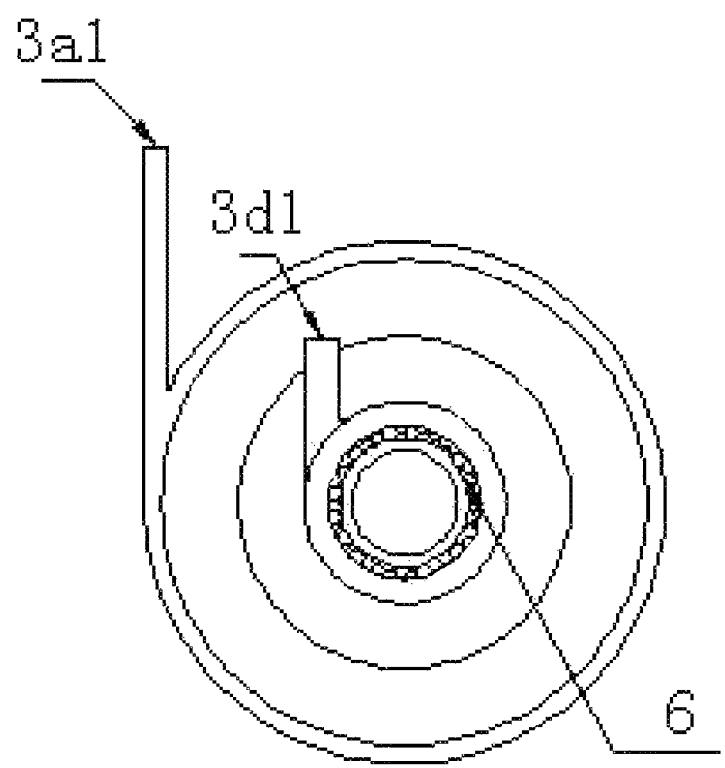
FIG. 2 is a cross-sectional view taken from line A-A of FIG. 1.
Figure 3:
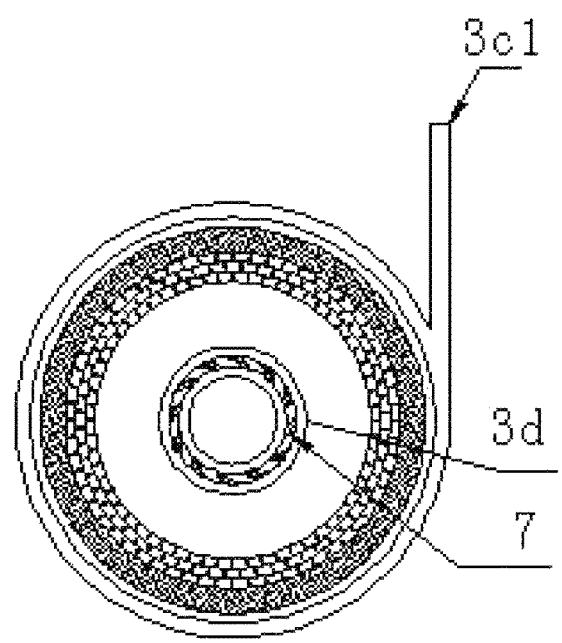
FIG. 3 is a cross-sectional view taken from line B-B of FIG. 1.

As shown in FIGS. 1-3, a device for preparing high-temperature, active particle-containing steam by using plasma comprises: a plasma generator 1, and a high-temperature steam generator 2. A plasma inlet 4 is arranged at a central part of one end of the high-temperature steam generator 2 and communicates with an outlet 1b of the plasma generator 1. The plasma generator 1 is provided with a non-oxidizing gas inlet 1a. An annular steam inlet 3d is provided to surround the plasma inlet 4. A rotary guide vane 7 is disposed inside the annular steam inlet 3d. The annular steam inlet 3d communicates with a pressure conveyor 3 via an annular cavity and a nozzle 3d1. A perforated plate 6 is disposed in the annular steam inlet 3d. The high-temperature steam generator comprises an outlet 5 for outputting the high-temperature, active particle-containing steam.

The high-temperature steam generator 2 comprises a housing in a gradually enlarged step structure. The housing comprises between 1 and 4 steps. Take a 3 steps housing of the high-temperature steam generator 2 as an example, the housing of the high-temperature steam generator 2 comprises sections of 2a, 2b, and 2c.

Annular gaps 3a, 3b, and 3c are arranged between every two adjacent steps of the housing for allowing the steam to enter the high-temperature steam generator. The annular gaps 3a, 3b, and 3c are connected to the pressure conveyor 3 through nozzles 3a1, 3b1, and 3c1 provided with annular cavities, respectively.

Each of the gradually enlarged steps of the housing of the high-temperature steam generator has a length of between 300 and 800 mm. The housing is made of a fire-proof material.

The annular gap has a radial width of between 3 and 15 mm.

A method for preparing high-temperature, active particle-containing steam by using plasma, comprises the following steps:

1) preparing steam; selecting one or several non-oxidizing gases as a working gas; ionizing the working gas into a plasma working medium by using a plasma generator; and 2) injecting the plasma working medium into a high-temperature steam generator comprising a rotary guide vane to form high-temperature ionized environment while introducing the steam through the rotary guide vane into the high-temperature steam generator for allowing the steam to contact with the plasma working medium so that the steam is heated and activated to form active particle-containing steam.

The working gas in step 1) is ionized into high-temperature plasma having a temperature of between 3,000 and 12,000 K by the plasma generator.

The steam comprises: unsaturated steam, saturated steam, superheated steam, or a mixture of a steam and the air or/and oxygen. Preferably, the steam is saturated steam.

Common non-oxidizing gas comprises: Ar, $N_2$, $H_2$, $CO_2$, and $CH_4$. Preferably, the non-oxidizing gas is nitrogen.

The plasma working medium in step 2) is injected into the high-temperature steam generator at a speed of between 30 and 100 m/s. The steam is injected into the high-temperature steam generator at a speed of between 5 and 30 m/s. A mass flow ratio of the plasma working medium to the steam in the high-temperature steam generator is adjusted for enabling the steam at an outlet of the high-temperature steam generator to have a temperature of between 1,000 and 4,000 K.

Between 1 and 4 annular gaps are arranged at intervals on the housing of the high-temperature steam generator. Part of the steam is guided through the annular gaps into the high-temperature steam generator by the force of a pressure conveyor and forms a low temperature water film on the wall of the high-temperature steam generator for protection.

Each of the gradually enlarged steps of the housing of the high-temperature steam generator has a length of between 300 and 800 mm. The annular gap has a radial width of between 3 and 15 mm.

Example 1

Working gas $N_2$ is ionized into high-temperature plasma having the temperature of 3,000 K by a plasma generator 1 and is injected into a high-temperature steam generator 2 at a speed of 30 m/s, so that a 3,000 K of high-temperature ionized environment is formed. One part of saturated steam is introduced through an annular steam inlet 3d provided with a rotary guide vane into the high-temperature steam generator 2 in the form of a rotary flow at a speed of 10 m/s, and the steam contacts with the high-temperature plasma. The other part of the steam is guided through annular gaps 3a, 3b, and 3c and into the high-temperature steam generator 2 at a speed of 5 m/s and forms a low temperature water film on a wall of the high-temperature steam generator 2 for protection. As the high-temperature plasma is abundant in ionized active particles, when the saturated steam is mixed and contacts with the high-temperature plasma, the steam is heated and ionized to be high-temperature steam containing active particles (active $H_2O$, active H, active O and $HO^-$, and $H^-$, $O^{+2}$). The steam after the reaction at an outlet 5 of the high-temperature steam generator 2 has the temperature of 1,500 K, and can be directly transferred into a gasification device for gasification.

Example 2

Working gas $CO_2$ is ionized into high-temperature plasma having the temperature of 5,000 K by a plasma generator 1 and is injected into a high-temperature steam generator 2 at a speed of 70 m/s, so that a 5,000 K of high-temperature ionized environment is formed. One part of saturated steam is introduced through an annular steam inlet 3d provided with a rotary guide vane into the high-temperature steam generator 2 in the form of a rotary flow at a speed of 15 m/s, and the steam contacts with the high-temperature plasma. The other part of the steam is guided through annular gaps 3a, 3b, and 3c and into the high-temperature steam generator 2 at a speed of 7 m/s and forms a low temperature water film on the wall of the high-temperature steam generator 2 for protection. As the high-temperature plasma is abundant in ionized active particles, when the saturated steam is mixed and contacts with the high-temperature plasma, the steam is heated and ionized to be high-temperature steam containing active particles (active $H_2O$, active H, active O and $HO^-$, and $H^-$, $O^{+2}$). The steam after the reaction at an outlet 5 of the high-temperature steam generator 2 has the temperature of 2,400 K, and can be directly transferred into a gasification device for gasification.

Example 3

Working gas Ar is ionized into high-temperature plasma having the temperature of 12,000 K by a plasma generator 1 and is injected into a high-temperature steam generator 2 at a speed of 100 m/s, so that a 10,000 K of high-temperature ionized environment is formed. One part of saturated steam is introduced through an annular steam inlet 3d provided with a rotary guide vane into the high-temperature steam generator 2 in the form of a rotary flow at a speed of 30 m/s, and the steam contacts with the high-temperature plasma. The other part of the steam is guided through annular gaps 3a, 3b, and 3c having a width of 10 mm and into the high-temperature steam generator 2 at a speed of 10 m/s and forms a low temperature water film on the wall of the high-temperature steam generator 2 for protection. As the high-temperature plasma is abundant in ionized active particles, when the saturated steam is mixed and contacts with the high-temperature plasma, the steam is heated and ionized to be high-temperature steam containing active particles (active $H_2O$, active H, active O and $HO^-$, and $H^-$, $O^{+2}$). The steam after the reaction at an outlet 5 of the high-temperature steam generator 2 has the temperature of 3,000 K, and can be directly transferred into a gasification device for gasification.

Steam inlets of the high-temperature steam generator of the invention are individually designed for preventing the steam from contacting with the electrodes. Therefore, those technical schemes that employ non-oxygen gas as an ionizing medium and adopt individual inlets to allow the steam to enter the high-temperature steam generator will fall within the protection scope of the invention.

The invention claimed is:

1. A method for producing an active particle-containing steam, the method comprising the following steps:
  1) preparing a first steam;
  2) selecting one or several non-oxidizing gases as a working gas;
  3) ionizing the working gas into a plasma working medium by using a plasma generator for generating plasma; and
  4) injecting the plasma working medium into a steam generator to form an ionized environment in the steam generator; wherein the steam generator is a separate device from the plasma generator; the steam generator comprises a plasma inlet, an annular steam inlet, an outlet, and a rotary guide vane, and the rotary guide vane is independent from the annular steam inlet and is disposed inside the annular steam inlet; and the plasma working medium is injected into the steam generator via the plasma inlet;
  5) introducing the first steam into the steam generator via the annular steam inlet, wherein the first steam is rotated by the rotary guide vane; and
  6) allowing the first steam to contact the plasma working medium in the steam generator, wherein the first steam is heated and activated by the plasma working medium to form the active particle-containing steam.

2. The method of claim 1, wherein the working gas is ionized into the plasma working medium having a temperature of between 3,000 and 12,000 K by the plasma generator.

3. The method of claim 1, wherein the working gas is nitrogen.

4. The method of claim 2, wherein the working gas is nitrogen.

5. The method of claim 1, wherein
  the plasma working medium is injected into the steam generator at a speed of between 30 and 100 m/s; and
  the first steam is injected into the steam generator at a speed of between 5 and 30 m/s.

6. The method of claim 2, wherein
  the plasma working medium is injected into the steam generator at a speed of between 30 and 100 m/s; and
  the first steam is injected into the steam generator at a speed of between 5 and 30 m/s.

7. The method of claim 1, wherein
  between 1 and 4 annular gaps are sequentially arranged at intervals on a housing of the steam generator, wherein the housing is divided into a plurality of sections by the annular gaps, each of the plurality of sections has an inner diameter;
  the inner diameters of the plurality of sections are sequentially larger along the direction from the plasma inlet to the outlet; and
  a second steam is guided through the annular gaps into the steam generator via nozzles each having an annular cavity by the force of a pressure conveyor and continuously hits a wall of the steam generator.

8. The method of claim 2, wherein
  between 1 and 4 annular gaps are sequentially arranged at intervals on a housing of the steam generator, wherein the housing is divided into a plurality of sections by the annular gaps, each of the plurality of sections has an inner diameter;
  the inner diameters of the plurality of sections are sequentially larger along the direction from the plasma inlet to the outlet; and
  a second steam is guided through the annular gaps into the steam generator via nozzles each having an annular cavity by the force of a pressure conveyor and continuously hits a wall of the steam generator, wherein a water film is continuously formed on the wall of the steam generator.

9. The method of claim 1, wherein the first steam is saturated steam.

10. The method of claim 2, wherein the first steam is saturated steam.

11. A method for producing a steam containing active particles, the method comprising:
  1) preparing a first steam;
  2) selecting one or several non-oxidizing gases as a working gas;
  3) ionizing the working gas into a plasma working medium by using a plasma generator; and
  4) injecting the plasma working medium into a steam generator to form an ionized environment in the steam generator; wherein the steam generator is a separate device from the plasma generator; the steam generator comprises a plasma inlet, an annular steam inlet, an outlet, and a rotary guide vane, and the rotary guide vane is independent from the annular steam inlet and is disposed inside the annular steam inlet; and the plasma working medium is injected into the steam generator via the plasma inlet;
5) introducing the first steam into the steam generator via the annular steam inlet, wherein the first steam is rotated by the rotary guide vane; and
6) heating and activating the first steam only by the plasma working medium to form the steam containing active particles.

12. The method of claim 1, wherein the working gas is ionized into the plasma working medium having a temperature of between 3,000 and 12,000 K by the plasma generator.

13. The method of claim 11, wherein the working gas is nitrogen.

14. The method of claim 11, wherein the active particles comprise active $H_2O$, active H, and active O.

15. The method of claim 11, wherein
the plasma working medium is injected into the steam generator at a speed of between 30 and 100 m/s; and
the first steam is injected into the steam generator at a speed of between 5 and 30 m/s.

16. The method of claim 12, wherein
the plasma working medium is injected into the steam generator at a speed of between 30 and 100 m/s; and
the first steam is injected into the steam generator at a speed of between 5 and 30 m/s.

17. The method of claim 11, wherein
between 1 and 4 annular gaps are sequentially arranged at intervals on a housing of the steam generator, wherein the housing is divided into a plurality of sections by the annular gaps, each of the plurality of sections has an inner diameter;
the inner diameters of the plurality of sections are sequentially larger along the direction from the plasma inlet to the outlet; and
a second steam is guided through the annular gaps into the steam generator via nozzles each having an annular cavity by the force of a pressure conveyor and continuously hits a wall of the steam generator.

18. The method of claim 12, wherein
between 1 and 4 annular gaps are sequentially arranged at intervals on a housing of the steam generator, wherein the housing is divided into a plurality of sections by the annular gaps, each of the plurality of sections has an inner diameter;
the inner diameters of the plurality of sections are sequentially larger along the direction from the plasma inlet to the outlet; and
a second steam is guided through the annular gaps into the steam generator via nozzles each having an annular cavity by the force of a pressure conveyor and continuously hits a wall of the steam generator.

19. The method of claim 11, wherein the first steam is saturated steam.

20. The method of claim 12, wherein the first steam is saturated steam.

* * * * *